Feb. 24, 1931.  M. M. TISON  1,794,261
ROTARY CUTTER
Filed May 14, 1930  2 Sheets-Sheet 1
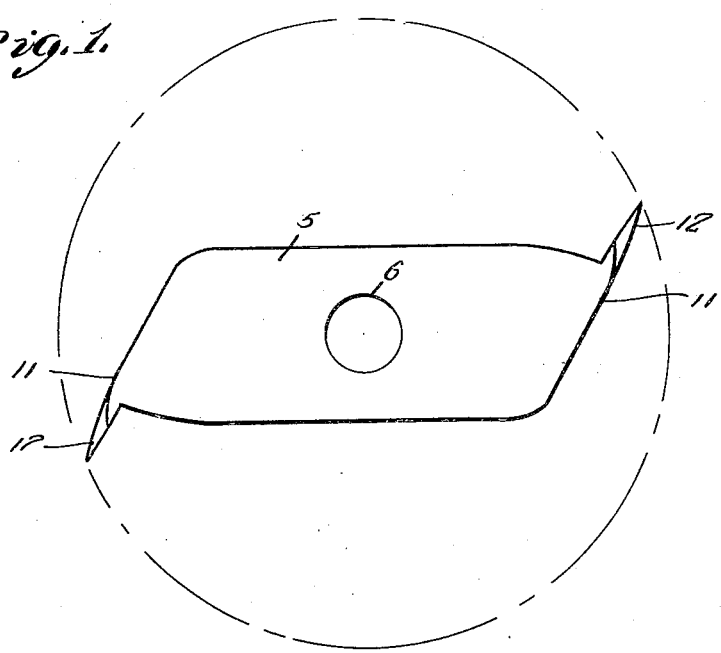
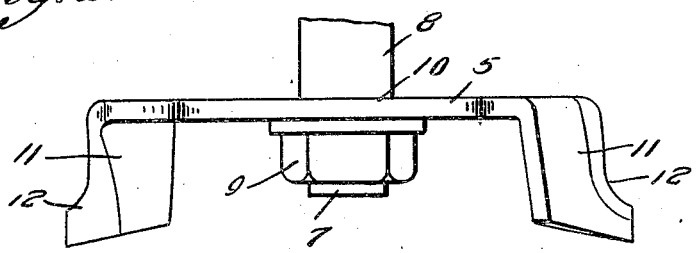
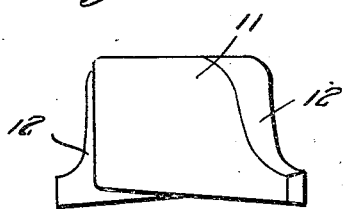
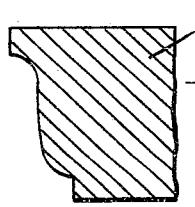
Inventor
M. M. Tison
By Clarence A. O'Brien
Attorney Inventor
M. M. Tison By Clarence A. O'Brien
Attorney Patented Feb. 24, 1931

1,794,261

UNITED STATES PATENT OFFICE

MOSE M. TISON, OF COTTAGE GROVE, OREGON

ROTARY CUTTER

Application filed May 14, 1930. Serial No. 452,430.

This invention appertains to new and useful improvements in cutter blades for rotary cutters, and more particularly to a novel blade capable of being detachably mounted on the shaft of workshop machines, such as are employed by carpenters and cabinet makers.

The principal object of the invention is to provide a rotary cutter blade of the interchangeable type, which are to be manufactured in sets for cutting various patterns to produce mouldings, beading, flooring and rabbeting.

Another important object of the invention is to provide rotary cutter blades for machines having rotary shafts, wherein the cutting heads are offset so as to not interfere with the machine when in the operation of cutting.

During the course of the following specification and claims, other important objects and advantages of the invention will readily become apparent to the reader.

In the drawings:—

Figure 1 represents a side elevational view of the cutter blade.

Fig. 2 represents an edge elevational view of the blade.

Fig. 3 represents an end elevation of the blade.

Fig. 4 represents a fragmentary sectional view of a moulding.

Figure 5:
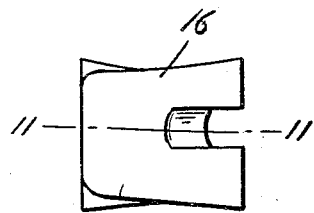
Fig. 5 represents an end elevation of the blade with the modified cutting head thereon.

Referring to the drawings wherein like numerals designate like parts, it can be seen that the blade comprises an elongated bar 5 provided with a circular opening 6 at its intermediate portion to receive the reduced end portion 7 of the rotary shaft 8 of a workshop machine. A nut 9 on the reduced portion 7 of the shaft urges the bar 5 snugly against the shoulder 10 of the shaft 8, for firmly retaining the bar in a position to rotate with the shaft.

At each end of the bar 5 and projecting laterally from the same side thereof is a cutter head 11. The cutter head 11 at one end has its cutting edge 12 along one edge portion thereof, while the head 11 at the opposite end of the bar 5 has its cutting edge 12 at the opposite edge portion, so that the head will cut successively against the work.

Figure 6:
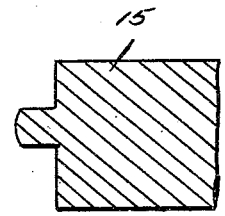
Fig. 6 is a fragmentary sectional view through the beaded edge of a piece of work, produced by the cutting edge shown in Fig. 5.

As is shown in Fig. 3, the cutter head 11 has its edge 12 of such a contour as to produce the woodwork shown in Fig. 4 and denoted by numeral 13. The cutter head 14 in Fig. 5 will produce the wood work 15, shown in Fig. 6.

Figure 7:
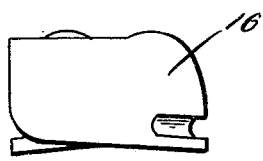
Fig. 7 represents an end elevation of the blade showing a second modified head structure.
Figure 8:
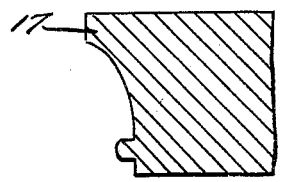
Figure 8 represents a fragmentary sectional view through a piece of molding produced by the head structure shown in Fig. 7.

The cutter head 16, shown in Fig. 7, will produce the wood work 17 shown in Fig. 8.

Figure 9:
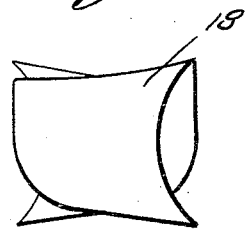
Fig. 9 represents an end elevation of the blade showing a third modified head structure.
Figure 10:
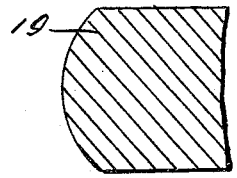
Fig. 10 represents a piece of woodwork produced by the blade structure shown in Fig. 9.
Figure 11:
Fig. 11 represents a fragmentary sectional view showing the same substantially on the line 11—11 of Fig. 5.

The cutter head 18 shown in Fig. 9 has its cutting edge of such configuration as to produce the wood work 19 shown in Fig. 10.

By having the cutter heads disposed laterally of one side of the bar and sloping in opposite directions for disposing their respective cutting edges on relatively opposite sides of the bar and in advance of the longitudinal edges thereof, moulding shapes may be produced in a rapid and expeditious manner.

While the foregoing specification sets forth the invention in definite terms, it is to be understood that numerous changes in the shape, size, and materials may be resorted to without departing from the spirit and scope of the invention as claimed hereinafter.

Having thus described my invention, what I claim as new is:—

A moulding cutter formed from a single piece of metal comprising an elongated narrow bar-like body of relatively thin cross section having opposite end portions bent on a bias to provide a pair of laterally extending and obliquely disposed cutter heads on one side of the body, said cutter heads being inclined to slope in relatively opposite directions and having cutting edges on relatively opposite edges thereof, said cutting edges being disposed forwardly of the opposite side edges of the body.

In testimony whereof I affix my signature.

MOSE M. TISON.